(12) United States Patent
Park et al.

(10) Patent No.: US 7,929,391 B2
(45) Date of Patent: Apr. 19, 2011

(54) WRITE-ONCE OPTICAL RECORDING MEDIUM AND DEFECT MANAGEMENT INFORMATION MANAGEMENT METHOD THEREOF

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/569,845

(22) Filed: Sep. 29, 2009

(65) Prior Publication Data

US 2010/0085852 A1    Apr. 8, 2010

Related U.S. Application Data

(63) Continuation of application No. 10/670,274, filed on Sep. 26, 2003, now Pat. No. 7,643,390.

(30) Foreign Application Priority Data

Feb. 21, 2003 (KR) .................. 10-2003-0010925
Mar. 3, 2003 (KR) .................. 10-2003-0013200
Apr. 16, 2003 (KR) .................. 10-2003-0023876

(51) Int. Cl.
*G11B 7/00* (2006.01)
(52) U.S. Cl. ............... 369/53.17; 369/47.22; 369/47.14; 369/59.25; 369/53.15
(58) Field of Classification Search .......... 369/53.17, 369/47.22, 59.25, 53.15
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi et al. | |
| 4,807,205 A | 2/1989 | Picard et al. | |
| 4,963,866 A | 10/1990 | Duncan | |
| 5,065,388 A | 11/1991 | Roth et al. | |
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A | 8/1993 | Bish et al. | |

(Continued)

FOREIGN PATENT DOCUMENTS

CN    1134017 A    10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner* — Wayne R Young
*Assistant Examiner* — Latanya Bibbins
(74) *Attorney, Agent, or Firm* — Birch, Stewart, Kolasch & Birch, LLP

(57) ABSTRACT

A write-once optical recording medium, a method for allocating a defect management area of the write-once optical recording medium, and a method for allocating a spare area of the write-once optical recording medium are provided. A method of managing defects on a write-once optical recording medium having at least one recording layer includes the steps of allocating at least one temporary defect management area having a fixed size and at least one temporary defect management area having a variable size to said optical recording medium, respectively, recording defect management information on the at least one temporary defect management area having a fixed size and the at least one temporary defect management area having a variable size; and using the at least one temporary defect management area having a fixed size and the at least one temporary defect management area having a variable size is provided herein.

20 Claims, 9 Drawing Sheets

U.S. PATENT DOCUMENTS

| | | |
|---|---|---|
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,666,335 A | 9/1997 | Horibe |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,872,750 A | 2/1999 | Satoh |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0055012 A1 | 5/2002 | Chou et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0133485 A1 | 9/2002 | Furuhashi |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |

| | | | | | | |
|---|---|---|---|---|---|---|
| 2006/0077827 | A1 | 4/2006 | Takahashi | JP | 2001-357623 A | 12/2001 |
| 2006/0195719 | A1 | 8/2006 | Ueda et al. | JP | 2002-015507 A | 1/2002 |
| 2006/0203635 | A1 | 9/2006 | Ko et al. | JP | 2002-015525 A | 1/2002 |
| 2006/0203638 | A1 | 9/2006 | Ko et al. | JP | 2002-056619 A | 2/2002 |
| 2006/0203684 | A1 | 9/2006 | Ko et al. | JP | 2002-215612 A | 8/2002 |
| 2006/0227694 | A1 | 10/2006 | Woerlee et al. | JP | 2002-245723 A | 8/2002 |
| 2007/0294571 | A1 | 12/2007 | Park et al. | JP | 2002-288938 A | 10/2002 |
| 2008/0046780 | A1 | 2/2008 | Shibuya et al. | JP | 2002-329321 A | 11/2002 |
| | | | | JP | 2002-352522 A | 12/2002 |

FOREIGN PATENT DOCUMENTS

| | | | | | |
|---|---|---|---|---|---|
| CN | 1140897 C | 1/1997 | JP | 2003-505813 A | 2/2003 |
| CN | 1227950 A | 9/1999 | JP | 2003-536194 A | 12/2003 |
| CN | 1273419 A | 11/2000 | JP | 2006-507733 | 1/2004 |
| CN | 1675708 A | 9/2005 | JP | 2004-280864 A | 10/2004 |
| CN | 1685426 A | 10/2005 | JP | 2004-280865 A | 10/2004 |
| DE | 199 54 054 A1 | 6/2000 | JP | 2005-56542 A | 3/2005 |
| EP | 0314186 A2 | 5/1989 | JP | 2005-004912 A | 6/2005 |
| EP | 0325823 A1 | 8/1989 | JP | 2005-535993 A | 11/2005 |
| EP | 0 350 920 A3 | 1/1990 | JP | 2005-538490 A | 12/2005 |
| EP | 0464811 A2 | 1/1992 | JP | 2005-538491 A | 12/2005 |
| EP | 0472484 A2 | 2/1992 | JP | 2006-500707 T | 1/2006 |
| EP | 0477503 A2 | 4/1992 | JP | 2006-519445 A | 8/2006 |
| EP | 0556046 A1 | 8/1993 | JP | 2006-522991 | 10/2006 |
| EP | 0871172 A2 | 10/1998 | KR | 10-2004-0023126 A | 3/2004 |
| EP | 0908882 A2 | 4/1999 | KR | 1020040094301 A | 11/2004 |
| EP | 0 957 477 A2 | 11/1999 | KR | 10-2005-0057396 A | 6/2005 |
| EP | 0974967 A1 | 1/2000 | RU | 2005 103 626 | 9/2005 |
| EP | 0989554 A1 | 3/2000 | RU | 2005 127 337 | 2/2006 |
| EP | 0997904 A1 | 5/2000 | TW | 371752 | 10/1999 |
| EP | 1026681 B1 | 8/2000 | TW | 413805 | 12/2000 |
| EP | 1043723 A1 | 10/2000 | TW | 448435 B | 8/2001 |
| EP | 1132914 A2 | 9/2001 | TW | 470946 B | 1/2002 |
| EP | 1 148 493 A2 | 10/2001 | TW | 497098 B | 8/2002 |
| EP | 1 152 402 A1 | 11/2001 | WO | WO-84/00628 A1 | 2/1984 |
| EP | 1152414 A2 | 11/2001 | WO | WO-96/30902 A1 | 10/1996 |
| EP | 1239478 A1 | 9/2002 | WO | WO-97/22182 A1 | 6/1997 |
| EP | 1274081 A2 | 1/2003 | WO | WO-00-07185 A1 | 2/2000 |
| EP | 1298659 A1 | 4/2003 | WO | WO-00/54274 A1 | 9/2000 |
| EP | 1329888 A1 | 7/2003 | WO | WO 01/06512 A1 | 1/2001 |
| EP | 1347452 A2 | 9/2003 | WO | WO-01/22416 A1 | 3/2001 |
| EP | 1547065 | 6/2005 | WO | WO-01/93035 A2 | 12/2001 |
| EP | 1564740 A1 | 8/2005 | WO | WO 01/95330 A2 | 12/2001 |
| EP | 1573723 | 9/2005 | WO | WO-03/007296 A1 | 1/2003 |
| EP | 1612790 A1 | 1/2006 | WO | WO-03/025924 A1 | 3/2003 |
| EP | 1623422 | 2/2006 | WO | WO-03/079353 A1 | 9/2003 |
| EP | 1595251 B1 | 9/2009 | WO | WO-2004/015707 A1 | 2/2004 |
| GB | 2356735 A | 5/2001 | WO | WO-2004/015708 A1 | 2/2004 |
| JP | 63-091842 A | 4/1988 | WO | WO-2004/025648 A1 | 3/2004 |
| JP | 64-46280 A | 2/1989 | WO | WO-2004/025649 A1 | 3/2004 |
| JP | 1-263955 A | 10/1989 | WO | WO 2004/027775 A1 | 4/2004 |
| JP | 02-023417 A | 1/1990 | WO | WO-2004/029668 A2 | 4/2004 |
| JP | 05-274814 A | 10/1993 | WO | WO-2004/029941 A1 | 4/2004 |
| JP | 6-338139 A | 12/1994 | WO | WO 2004/029942 A1 | 4/2004 |
| JP | 06-349201 A | 12/1994 | WO | WO-2004/034396 A1 | 4/2004 |
| JP | 08-096522 A | 4/1996 | WO | WO-2004/036561 A1 | 4/2004 |
| JP | 8-273162 A | 10/1996 | WO | WO-2004/053872 A1 | 6/2004 |
| JP | 09-145634 A | 6/1997 | WO | WO-2004/053874 A1 | 6/2004 |
| JP | 09-231053 A | 9/1997 | WO | WO-2004/068476 A1 | 8/2004 |
| JP | 9-270175 A | 10/1997 | WO | WO 2004/072963 A1 | 8/2004 |
| JP | 10-050005 A | 2/1998 | WO | WO-2004/075180 A1 | 9/2004 |
| JP | 10-050032 A | 2/1998 | WO | WO-2004/079631 A2 | 9/2004 |
| JP | 10-187356 A | 7/1998 | WO | WO 2004/079729 A1 | 9/2004 |
| JP | 10-187357 A | 7/1998 | WO | WO-2004/079731 A1 | 9/2004 |
| JP | 10-187358 A | 7/1998 | WO | WO-2004/079740 A1 | 9/2004 |
| JP | 10-187359 A | 7/1998 | WO | WO 2004/081926 A1 | 9/2004 |
| JP | 10-187360 A | 7/1998 | WO | WO 2004/090890 A1 | 10/2004 |
| JP | 10-187361 A | 7/1998 | WO | WO-2004/093035 A1 | 10/2004 |
| JP | 11-110888 A | 4/1999 | WO | WO-2004/100155 A1 | 11/2004 |
| JP | 11-203792 A | 7/1999 | WO | WO-2004/100156 A1 | 11/2004 |
| JP | 2000-090588 A | 3/2000 | WO | WO-2005/004123 A1 | 1/2005 |
| JP | 2000-149449 A | 5/2000 | WO | WO-2005/004154 A2 | 1/2005 |
| JP | 2000-195178 A | 7/2000 | | | |
| JP | 2000-215612 | 8/2000 | | | |
| JP | 2000-285607 A | 10/2000 | | OTHER PUBLICATIONS | |
| JP | 2001-023317 A | 1/2001 | | | |
| JP | 2001-069440 A | 3/2001 | | | |
| JP | 2001-110168 A | 4/2001 | | | |
| JP | 2001-266464 A | 9/2001 | | | |
| JP | 2001-351334 A | 12/2001 | | | |

OTHER PUBLICATIONS

XP-002289010, "ECMA 238 Data interchange on 130mm optical disks of type Worm using irreversible effects—capacity 2,6 Gbytes per cartridge", Internet Citation, Jun. 1996.

ECMA: Standardizing Information and Communication Systems: "Standard ECMA-240: Data Interchange on 120 mm Optical Disk Cartridges using Phase Change PD Format—Capacity: 650 Mbytes per Cartridge", Standard ECMA 240, [Online] Jun. 1, 1996, pp. 41-53, XP002562014 Retrieved from the Internet:URL:http://www.ecma-international.org/publications/standards/Ecma-240.htm [retrieved on Jan. 4, 2010].

ECMA: "120 mm DVD Rewritable Disk (DVD-RAM)" Internet Citation Feb. 1, 1998, pp. 43-55, XP002518235, Retrieved from the Internet: URL:http://www.ecma-international.org/publications/files/ECMA-ST/Ecma-272%201st%20edition%20February%201998.pdf [retrieved on Feb. 1, 2009].

| Type | Contents | Recording Timing |
|------|----------|------------------|
| DMA | DDS/DFL | At DMA fill-in function |
| TDMA | TDDS/TDFL | At eject of disc |
| IDMA | TDDS/TDFL | During use | ex 1 : Disc Finalize
ex 2 : Spare Area Full
ex 3 : TDMA & IDMA Full

WRITE-ONCE OPTICAL RECORDING MEDIUM AND DEFECT MANAGEMENT INFORMATION MANAGEMENT METHOD THEREOF This application is a Continuation of application Ser. No. 10/670,274 filed on Sep. 26, 2003 now U.S. Pat. No. 7,643,390, which claims the priority benefit of the Korean Application Nos. P2003-010925 filed on Feb. 21, 2003, P2003-013200 filed on Mar. 3, 2003 and P2003-023876 filed on Apr. 16, 2003, which are hereby incorporated by reference.

BACKGROUND OF THE INVENTION

1. Field of the Invention

The present invention relates to a write-once optical recording medium, a method and apparatus for managing defect management information thereof, and more particularly, to a method and device for allocating a temporary defect management area, a method for allocating a spare area for defect management, and a write-once optical recording medium on which the temporary defect management area and the spare area are allocated on a type of the optical recording medium such as a write-once blu-ray disc.

2. Discussion of the Background Art

Optical discs, which are a kind of optical recording media, can record a large amount of data, and are now being widely used. Currently, a kind of innovative high-density digital versatile disc (HD-DVD) such as blue ray disc (Blu-ray Disc) is under development. This kind of medium can record and store video data of high quality and audio data of high fidelity for a long time.

The Blu-ray disc is a next generation optical recording solution that can store a larger amount of data than a conventional DVD.

The Blu-ray disc generally employs a blue-violet laser having a wavelength of 405 nm. This wavelength is shorter than a red laser used on a conventional DVD. The wavelength of the red laser is 650 nm. The Blu-ray disc has a thickness of 1.2 mm and a diameter of 12 cm, and includes a light transmission layer having a thickness of about 0.1 mm. Therefore, the Blu-ray disc can store a larger amount of data than a conventional DVD.

An optical disc device for writing and reading data on the Blu-ray disc is shown in FIG. 1. It includes an optical pick-up 11 for writing and reading a signal on/from an optical disc 10, a video disc recorder (VDR) system 12 for processing the signal read out from the optical pick-up 11 into a replay signal, or for modulating and processing an externally inputted data stream into a record signal suitable for recording, and an encoder 13 for encoding an externally inputted analog signal and outputting the encoded analog signal to the VDR system 12.

A Blu-ray disc can be of a rewritable type, which is referred to herein as a Blu-ray Disc Rewritable (BD-RE). A BD-RE has a rewritable capability, which enables video and audio data to be written, erased, and rewritten thereon repeatedly. The BD-RE (shown in FIG. 2) is divided into a lead-in area (LIA), a data area and a lead-out area (LOA), and the front and the rear of the data area are allocated to have an inner spare area (ISA) and an outer spare area (OSA).

With the BD-RE configured in the manner described above, the VDR system 12 of the optical disc device shown in FIG. 1 encodes and modulates externally inputted data into a signal suitable for recording, and records by cluster unit corresponding to error correction block unit. If a defective area occurs in the data area while recording data on the BD-RE, the data of one cluster unit recorded on the defective area is also recorded on the spare area (for example, the inner spare area on the BD-RE) according to a linear replacement operation. A series of linear replacement operations can be performed.

Accordingly, the VDR system 12 of the optical disc device records the data of the cluster unit recorded on the defective area onto the spare area, even if the defective area occurs in the data area of the rewritable Blu-ray disc. When a playback operation is performed for the rewritable Blu-ray disc, the data recorded onto the spare area are read out and replayed so that a data recording error can be prevented.

Various standards related to the Blu-ray disc are under development.

In this respect, a second type of Blu-ray disc, on which data is not repeatedly rewritten (non-rewritable), but is written only once, is herein referred to as a Blu-ray Disc Write-Once (BD-WO).

The Write-once Blu-Ray disc is useful when it is not desirable to repeatedly rewrite data. In a BD-WO, management of defective areas is needed.

Since data can be recorded on the BD-RE repeatedly (due to the characteristics of the BD-RE), the size of the defect management area (DMA) for the rewritable Blu-ray disc is relatively small (see DMA1-DMA4 in FIG. 2). In contrast, since data is recorded on the write-once Blu-ray disc only one time, the area required to manage the defective area for the BD-WO needs to be larger than the area required for the BD-RE. Accordingly, a sufficiently sized defect management area should be allocated for the BD-WO.

An effective defect management method for a BD-WO requires consistency and compatibility with standards that are applicable to the BD-RE, including consistency and compatibility related to recording and replaying of management information in order to obtain more efficient, more stable and higher performance in recording and replaying information and data. Thus, an innovative method, apparatus and structure for both recording and management of defective areas and related information for the BD-WO are needed.

SUMMARY OF THE INVENTION

Accordingly, the present invention is directed to a write-once optical recording medium (BD-WO), a defect management information management method thereof, and an apparatus for implementing the method, that substantially obviate one or more problems due to limitations and disadvantages of the background art.

Additional advantages, objects, and features of the invention will be set forth in part in the description which follows, and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing defects on a write-once optical recording medium having at least one recording layer, the method comprising the steps of allocating at least one temporary defect management area having a fixed size and at least one temporary defect management area having a variable size to the optical recording medium, respectively, and recording defect management information on the at least one temporary defect management area having a fixed size and/or the at least one temporary defect management area having a variable size.

In another aspect of the present invention, an apparatus for managing defects on a write-once optical recording medium, the apparatus comprising means for allocating at least one temporary defect management area having a fixed size and at least one temporary defect management area having a variable size to the optical recording medium, respectively, and means for recording defect management information on the at least one temporary defect management area having a fixed size and/or the at least one temporary defect management area having a variable size.

In another aspect of the present invention, a write-once optical recording medium having at least one recording layer comprises at least one temporary defect management area having a fixed size and at least one temporary defect management area having a variable size, wherein defect management information is recorded on the at least one temporary defect management area having a fixed size and/or the at least one temporary defect management area having a variable size.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention, and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
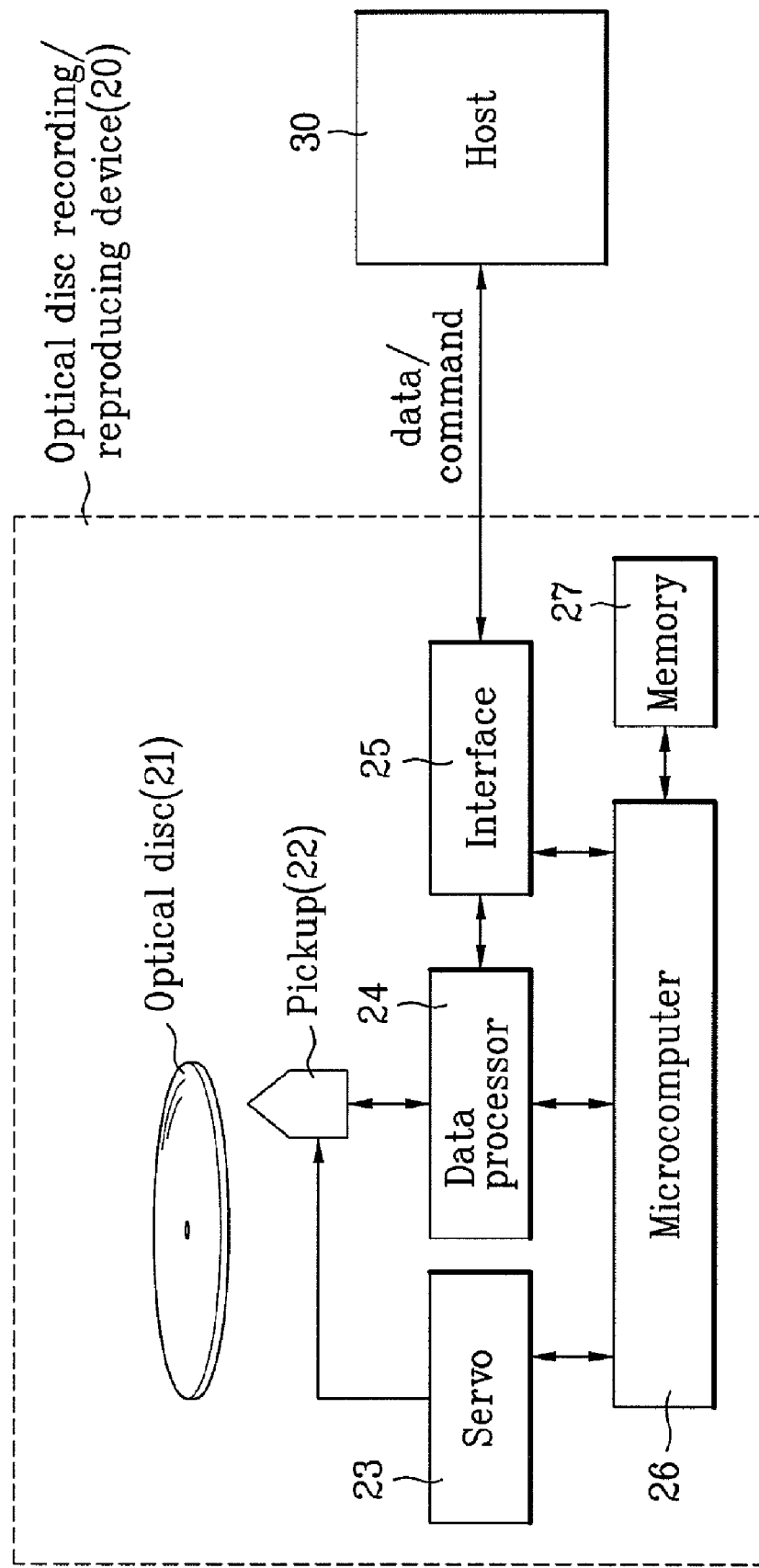
FIG. 3 illustrates a schematic configuration of an optical disc device for a BD-WO of the present invention.

Referring to FIG. 3, an optical disc recording/reproducing device 20 for a Blu-ray write-once optical recording medium according to the present invention includes an optical pickup 22 for writing/reading data to/from an optical recording medium 21 such as a BD-WO, a pickup servo unit 23 for controlling the optical pickup 22 to maintain a distance between an objective lens in the optical pickup 22 and the optical recording medium 21 and for tracking a pertinent track, a data processor 24 for processing and providing input data to the optical pickup 22, an interface 25 for exchanging data with an external host 30, a memory 27 for storing information regarding defect management, and a microcomputer 26 for controlling the above units. All of the components of the device 20 are operatively coupled. The host 30 is connected to the interface 25 of the device 20 for recording/reproducing data to/from the optical recording medium 21 for exchange of commands and data.

Figure 1:
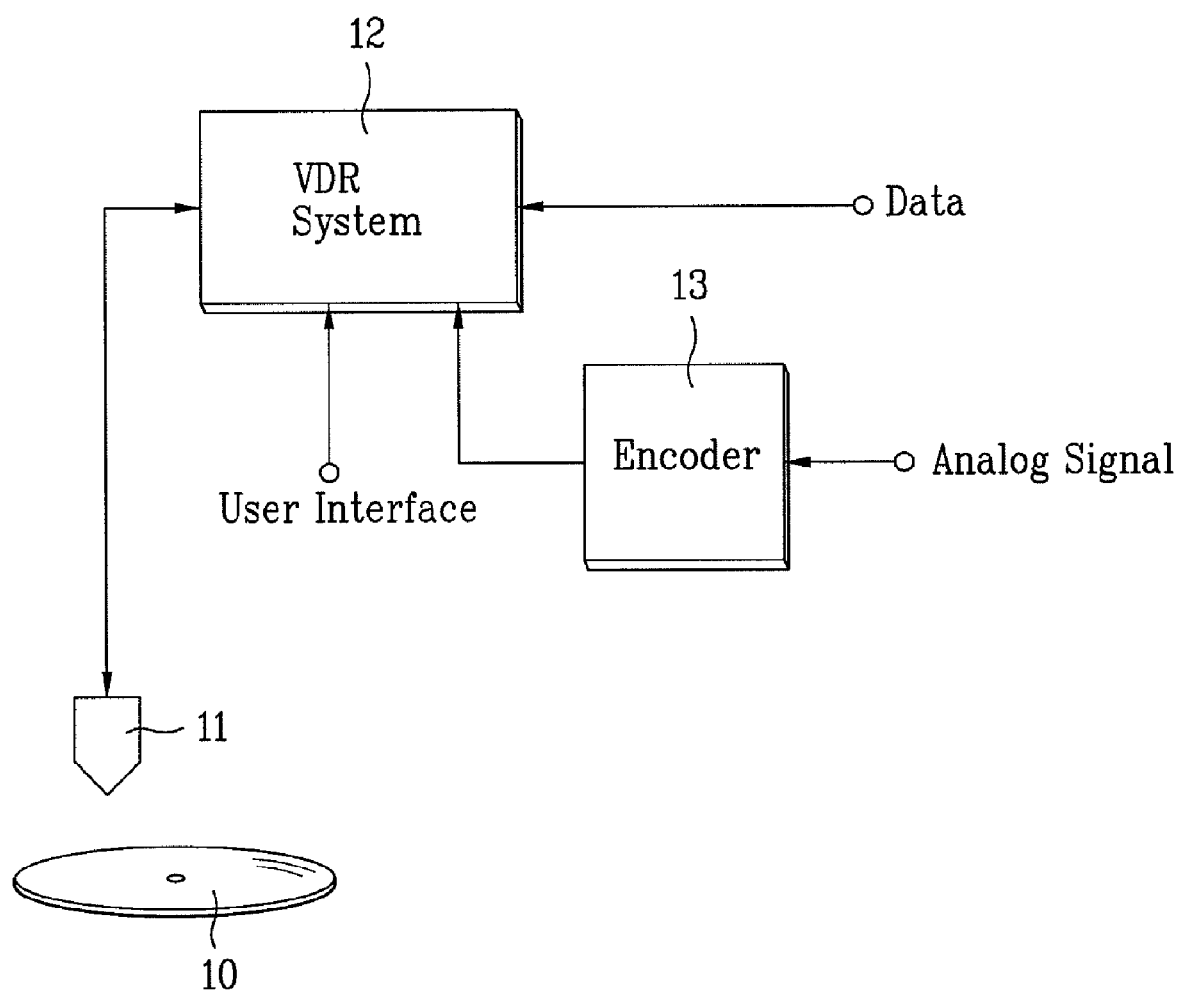
FIG. 1 illustrates a schematic configuration of an optical disc device of the Background Art.
Figure 2:
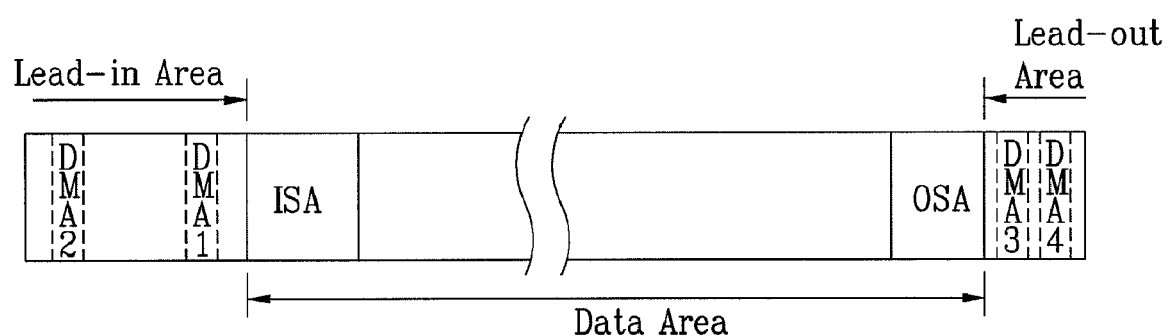
FIG. 2 illustrates a configuration of a recording area of a BD-RE.

When an optical recording medium such as a BD-WO is loaded, the device 20 loads information regarding defect management, such as DMA (defect management area) information, TDMA (temporary defect management area) information and so on, into the memory 26 or other suitable storage. During operation, the memory 27 is updated in accordance with a defect management operation. The present method can be also implemented using the device shown in FIG. 1 or other suitable devices or systems.

Figure 4:
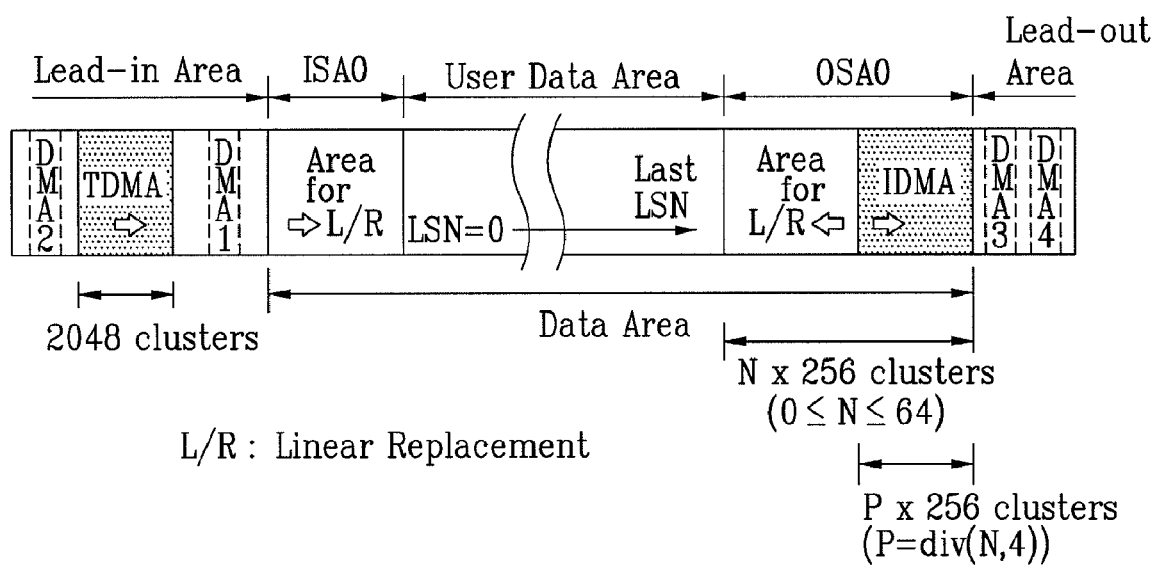
FIG. 4 illustrates a configuration of a recording area of an optical recording medium according to an embodiment of the present invention.

FIG. 4 illustrates a configuration of a recording area of a BD-WO according to the present invention. The BD-WO shown in FIG. 4 has a structure of a single layer disc. Also, the BD-WO shown in FIG. 4 includes a lead-in area, a data area and a lead-out area. A user data area is located in the data area. The lead-in and lead-out areas include final or permanent defect management areas (DMA1-DMA4). The arrows in each respective area are used as examples of a data recording direction.

A temporary defect management area (TDMA) according to the present invention is provided in the lead-in area of the BD-WO. Here, the TDMA can be distinguished from the defect management areas (DMA1, DMA2, DMA3, DMA4). Particularly, the temporary defect management area (TDMA) is an area of the BD-WO that is used to temporarily record and manage defect management information until the BD-WO is finalized. Afterward, the defect management information is recorded onto at least one of multiple defect management areas, for example, DMA1-DMA4 on a recording layer shown in FIG. 4. The BD-WO is considered to be finalized, e.g., when recording of data onto a user data area of the BD-WO has been completed. The TDMA provided in the lead-in area has a fixed size, for example, 2048 clusters.

The data area of the BD-WO shown in FIG. 4 includes the user data area, an inner spare area ISA0 and an outer spare area OSA0. The entire inner spare area ISA0 is used as an area for linear replacement, i.e., a replacement area for storing data assigned to a defective area of the user data area. No TDMA is allocated to the inner spare area ISA0. The outer spare area OSA0 includes an interim defect management area (IDMA) as provided by an embodiment of the present invention. Here, the IDMA is distinguished from the TDMA having a fixed size in the lead-in area described above. In this regard, the IDMA is considered a temporary defect management area having a variable size. However, the TDMA and the IDMA may have the same contents despite the difference between the terms and/or may differ from each other depending on a manner in which the TDMA and IDMA are used with respect to various manners, times and/or events in the actual recording process. This will be discussed in more detail when the methods of using the TDMA and IDMA are discussed.

In the single layer BD-WO shown in FIG. 4, a portion of the outer spare area OSA0 is used as the IDMA and a remaining portion of the outer spare area OSA0 is used as an area for linear replacement (replacement area). For example, the IDMA is allocated to a portion adjacent to the replacement area of the OSA0. The size of the IDMA is variably allocated depending on the size of the spare area. Since the outer spare area (OSA0) has a variable size, the IDMA also has a variable size.

Here, the IDMA having a variable size is allocated to the data area, depending on whether or not there is a determination made to allocate a spare area. If an outer spare area is to be allocated, the IDMA may be allocated in the manner described above. If an outer spare area is not allocated, only the TDMA having a fixed size is allocated (IDMA is not allocated). In such a case, the TDMA is used to manage defect management information. In another example, even though the spare area OSA0 exists, the IDMA may still not be allocated according to a choice of design. This means that the designer has a wide variety of design choices with respect to allocation of the IDMA. However, if the spare area (e.g., OSA0) is allocated, in one embodiment both are generally always allocated together, that is, if OSA0 is allocated, the IDMA is allocated also in the OSA0.

The size of the IDMA positioned at the outer track of the disc depends on the size of the spare area OSA0 (the size of OSA0 is variable). For example, if the size of the spare area OSA0 is N×256 ($0 \leq N \leq 64$) clusters, the size of the IDMA can be varied to P×256 clusters, where P=N/4. P and N may be integers. In other words, in the example set forth above, a method can be used (as an example) in which the size of the IDMA (having a variable size) is allocated by one-fourth the size of the outer spare area.

As an example, if N=64, since the size of the outer spare area OSA0 is 16384 clusters and P=N/4=16, the size of the interim defect management area IDMA is 4096 clusters.

Similarly, the size of the IDMA positioned at an outer track area of the disc may have a size that is different from the example given above in that it is made to be variable depending on the size of the spare area OSA0. This is possible in a case which takes into consideration that when the area for linear replacement is reserved in the outer spare area OSA0, the size of the area for linear replacement, the size of the defect management area and the size of the spare area OSA0 all depend on one another. In comparison, the size of the inner track area, especially the size of the TDMA positioned at the lead-in area, has a fixed value.

In the embodiment shown in FIG. 4, it is readily apparent that the TDMA is not positioned in the data area, but is positioned in the lead-in area. The interim defect management area IDMA is positioned in the outer spare area OSA0 and can be set to a size of '0'. In this case, the entire OSA0 would be used as a replacement area. In another case, the ISA0 and OSA0 can be allocated by a size of '0' if no defect management is to be performed. Nevertheless, since the TDMA of the lead-in area is available, specific information can be recorded and managed using a temporary disc definition structure (TDDS), even though a temporary defect list (TDFL) is not managed. A further explanation of the method in which the TDFL and TDDS is recorded (and used herein) will be provided later.

According to the present embodiment, if a defective area (e.g., the user data area) is created or discovered when data are recorded in the BD-WO, the data recorded (or to be recorded) on the defective area is recorded on a predetermined area for linear replacement. A defective area may be created as a result of the recording process itself, or a defective area may be "discovered" while recording. In the latter case, a discovered defective area is not the result of the current recording process. In case of the created defect, the corresponding defect management information is recorded on both the temporary and interim defect management areas TDMA and IDMA.

Figure 5:
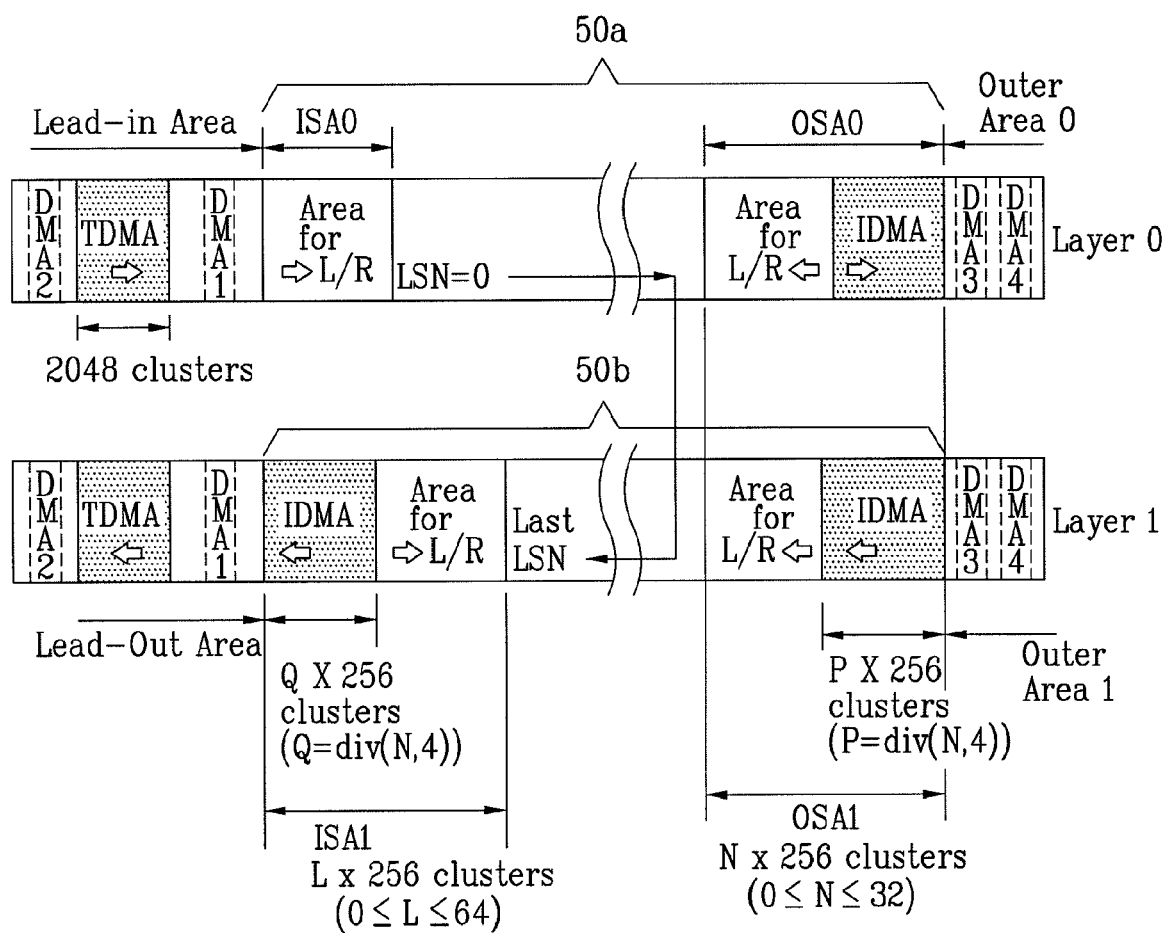
FIG. 5 illustrates a configuration of a recording area of an optical recording medium according to another embodiment of the present invention.

FIG. 5 shows an embodiment of the present invention, which illustrates another configuration of a recording area of a BD-WO. The BD-WO shown in FIG. 5 has a structure of a dual layer disc. The BD-WO structure shown in FIG. 5 includes a lead-in area, a data area 50a and an outer area (Outer Area 0) on a first recording layer (Layer 0), and a lead-out area, a data area 50b and an outer area (Outer Area 1) on a second recording layer (Layer 1).

The arrows in each area are examples which indicate a data recording direction.

In the dual layer BD-WO shown, however, the temporary defect management area (TDMA) of the present invention is provided in both the lead-in area and the lead-out area. The data areas 50a, 50b include inner spare areas ISA0 and ISA1 and outer spare areas OSA0 and OSA1 as shown. Each of the inner spare area ISA1 and the outer spare areas OSA0 and OSA1 includes an IDMA on each recording layer. In other words, an IDMA is allocated to each of the spare areas OSA0, OSA1 and ISA1, all having a variable size depending on the variable size of the spare area except for ISA0 (which may have a fixed size).

In this example, the TDMA provided in the lead-in area (first recording layer) and the lead-out area (second recording layer) of the dual layer BD-WO shown in FIG. 5 has a fixed size, for example, 2048 clusters.

All of the inner spare area ISA0 is used as an area for linear replacement. In other words, an IDMA for temporary defect management is not allocated to the inner spare area ISA0.

Portions of the inner spare area ISA1 and the outer spare areas OSA0 and OSA1 are used as the IDMA, and the remaining portions (or other portions) of the inner spare area ISA1 and the outer spare areas OSA0 and OSA1 are used as areas for linear replacement of a defective area. In one example, IDMAs are allocated to a portion in the spare areas which is adjacent to an area for linear replacement. The size of the IDMA(s) is allocated depending on the size of the spare areas ISA1, OSA0 and OSA1 (these spare areas have a variable size).

Here, the IDMAs having a variable size are allocated to the data area depending on whether or not a determination is made to allocate the corresponding spare areas (spare area that corresponds to the particular IDMA). If the spare area is allocated, the IDMAs may be allocated as described above. If the spare areas are not allocated, only the TDMAs are allocated. Some or all of the lead-in area and/or the lead-out area may be used to store defect management information. As one example, if the size of the outer spare area OSA0, OSA1 is N×256 ($0 \leq N \leq 32$) clusters and the size of the inner spare area ISA1 is L×256 ($0 \leq L \leq 64$) clusters, then the size of the interim defect management areas in the OSA0 and OSA1 can be varied to P×256 clusters and the size of the interim defect management area in the ISA1 can be varied to Q×256 clusters, where P and Q are determined to be P=N/4 and Q=L/4. N and L may be integers. This method can be referred to as a method in which the size of the IDMA having a variable size is allocated by one-fourth the size of the corresponding outer or inner spare area OSA0, OSA1 or ISA1.

For example, if N=32, since the size of the outer spare areas (OSA0+OSA1) is 16384 clusters and P=N/4=8, the total size of the IDMA in the OSA0 and the IDMA in the OSA1 is 4096 clusters. If L=64, since the size of the inner spare area ISA1 is 16384 clusters and Q=L/4=16, the size of IDMA in the ISA1 is 4096 clusters. Then the total size of all the interim defect management areas on the first and second recording layers is 8192 clusters.

Similarly, the size of the IDMAs is made to be variable depending on the size of the spare areas ISA1, OSA0 and OSA1, taking into account that when the area for linear replacement is designed to be in the spare area, the size of the area for linear replacement, the size of the defect management area and the size of the spare area all depend on one another. In comparison, the size of the inner track area (especially the TDMA positioned at the lead-in area and the lead-out area) has a fixed value.

In the above embodiment having a dual layer BD-WO structure of the present invention, it is readily apparent that the TDMA is positioned in the lead-in area and also positioned in the lead-out area. The interim defect management areas IDMAs positioned on the spare areas may have a size of '0' if all of the data area is used for user data recording. The spare areas may be allocated by a size of '0' if defect management is not performed. Nevertheless, since the TDMAs of the lead-in area and the lead-out area remain available for use, specific information can be recorded and managed using a temporary disc definition structure (TDDS) although a temporary defect list (TDFL) may not be managed. These will be explained in more detail later, but meanwhile, an IDMA having a size of "0" is an indication that the TDFL is not managed.

Also according to the embodiment shown in FIG. 5, if a defective area is created during the actual recording of data in the BD-WO, the data to be recorded on the defective area is recorded on a predetermined area for linear replacement. In such a case, the associated defect management information may be recorded on both the temporary and interim defect management areas TDMA and IDMA in the OSA0, OSA1 or ISA1.

In general, allocation of an IDMA depends on whether or not a determination is made to allocate a spare area. Once a determination is made to allocate a spare area, the method of allocating an IDMA (employing the method of allocating a spare area and the method of managing a defect) will be applicable as described herein.

In addition to the discussion set forth above, there is also a case to be considered in which a spare area is not allocated in the dual layer BD-WO. Particularly, there is a case in which only the TDMA is used, and a case in which only the TDMA is used if only the inner spare area ISA0 is allocated. If the inner spare area ISA0 and outer spare areas OSA0 and OSA1 are allocated, the IDMAS in the OSA0 and OSA1 are allocated. If only the inner spare areas ISA0 and ISA1 are allocated but the outer spare areas OSA0 and OSA1 are not allocated, the interim defect management area IDMA in the ISA1 can be allocated. If all of the spare areas are allocated, the IDMAs in the ISA1, OSA0 and OSA1 can all be allocated as described above.

Figure 6:
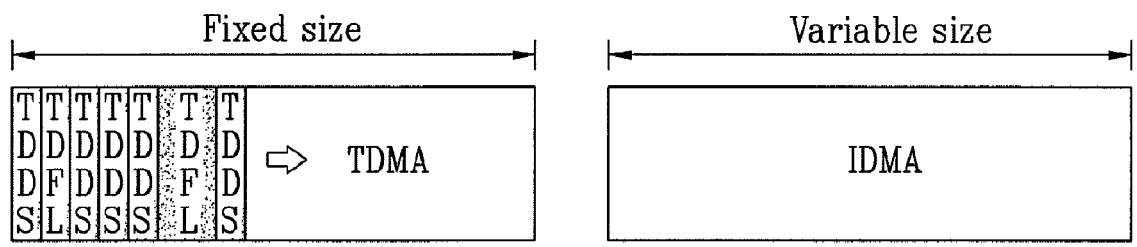
FIG. 6 illustrates an example of a temporary or interim defect management area usage method of the present invention.

FIG. 6 illustrates an example of a method of using temporary or interim defect management areas TDMA or IDMA in the single layer or dual layer BD-WO according to an embodiment of the present invention. In this method, the TDMA shows both TDDS and TDFL. However, although not shown in the illustration, the IDMA can also include both TDDS and TDFL. The embodiment shown in FIG. 6 illustrates that the particular defect management information (TDDS and TDFL) is recorded in the TDMA before it is recorded in the IDMA.

A discussion of TDDS and TDFL will now be provided. In the present invention, TDDS refers to temporary disc definition structure and is distinguished from DDS (disc definition structure), in that TDDS is temporary. Similarly TDFL refers to a temporary defect list, and is distinguished from a DFL (defect list) in that TDDS is temporary. Herein, both the TDFL and TDDS are included in the TDMA, and also both the TDFL and TDDS are included in the IDMA.

The temporary defect list (TDFL) contains (in part) a list of clusters that are determined to be defective during the use of the media. In relation thereto, TDDS specifies the format and status of the disc with relation to defect management, and in general, provides overall management information. A format of the disc may include information regarding the specific layout of areas on the disc for managing defective areas, and status of a disc may include various flags (explained below). The TDFL includes the addresses of the defective areas and the replacement areas on the BD-WO. TDDS and TDFL recorded in temporary defect management areas (for example, TDMA and IDMA), becomes permanent information (DDS and DFL) which is written in permanent defect management areas (for example DMA1-DMA4). For instance, when a disc is finalized, TDDS and TDFL are transferred and recorded in at least one of the DMAs. During the user data recording operation of the BD-WO, the TDDS and TDFL are updated periodically or at the same time and the updates are recorded in the TDMA(s) and/or the IDMA(s). The particular operation of these will become more apparent as the discussion thereof progresses.

In the embodiment shown in FIG. 6, the TDMA is used first (before the IDMA is used) to record defect management information such as TDDS and TDFL. When the TDMA is full, the IDMA is used to record defect management information. However, in another variation, the IDMA is used first (before the TDMA). In this case, when the IDMA is full, the TDMA is used to record the defect management information. In such an instance, information providing notification of which area among the TDMA is full is indicated by a "full flag" of TDMA. The "full flag" indication is necessary because preferred embodiments disclosed herein require information indicating which area among a plurality of TDMAS and/or IDMAS is full. In one example, this TDMA full flag may be included in TDDS.

Accordingly, in the embodiment of FIG. 6, the TDMA and IDMA, or the IDMA and TDMA are sequentially used to store defect management information. In further embodiments, the TDMA and IDMA are located in both lead-in areas and lead-out areas. The usage of a particular TDMA and IDMA depends on a variety of factors, examples of which will be provided in a discussion of methods of using TDMA and IDMA.

It should be noted that the method of FIG. 6 and any other methods discussed herein (FIGS. 7-11) are applicable to the disc structures of FIGS. 4 and 5 and any other variations thereof discussed above. It should also be noted that the present invention encompasses embodiments that include a plurality of TDMAs and IDMAs on each recording layer of the BD-WO.

Figure 10:
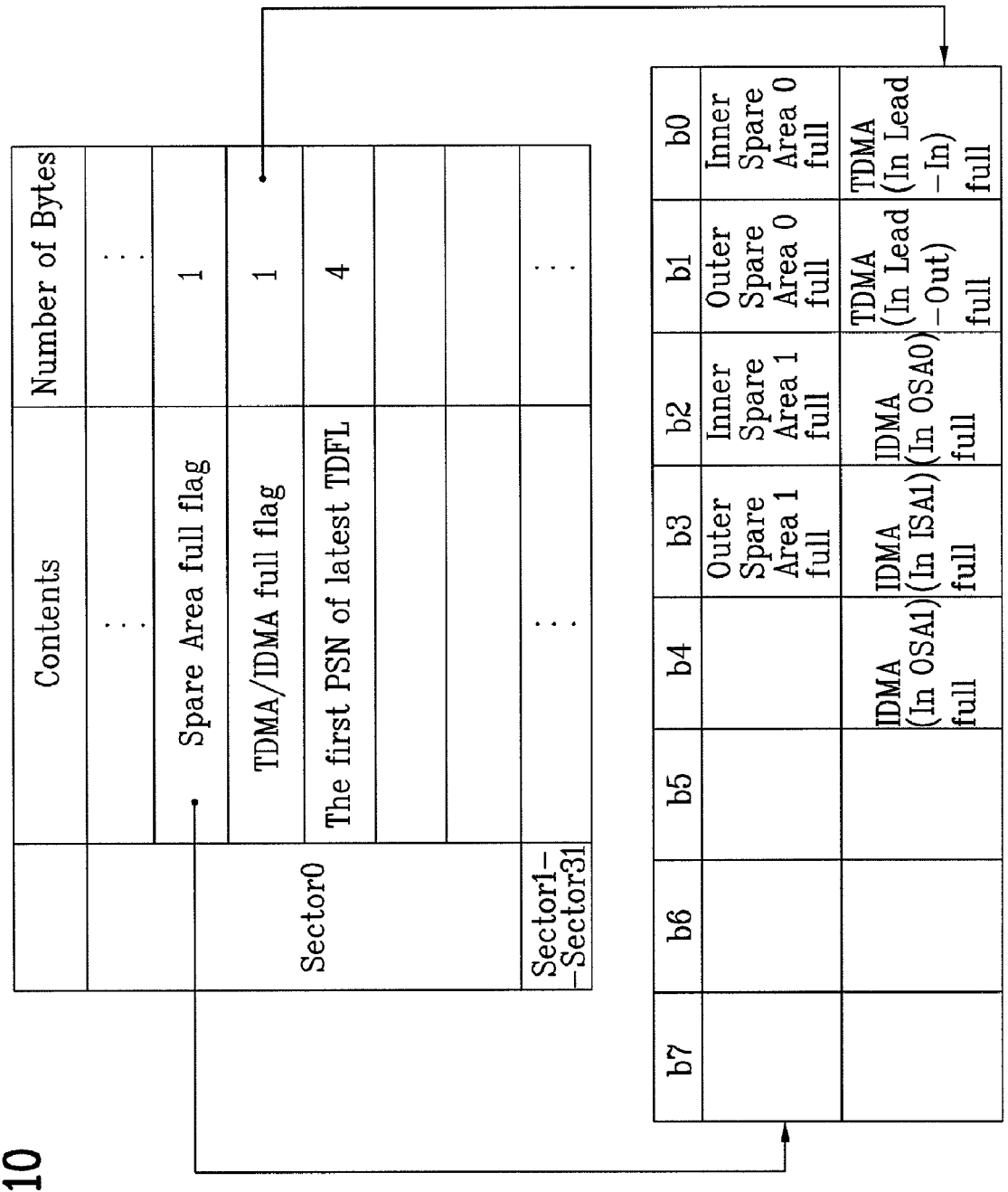
FIG. 10 illustrates a configuration of TDDS and information contents according to an embodiment of the present invention.

FIG. 10 illustrates an example of a full flag indicating that the TDMA and/or IDMA is full (as recorded in the TDDS) according to an embodiment of the present invention. The TDDS, as mentioned above, includes overall management information. In order to manage a defective area in the present invention, various full flags such as 'Spare Area full flag' and 'TDMA/IDMA full flag', and indicators such as 'the first PSN of latest TDFL' are used and included in the TDDS recorded in the TDMA(s) and/or IDMA(s). Particularly, a full flag provides information on whether a specific area is full and may be a 1-bit indication corresponding to the specific area. In the embodiment shown, if the specific area is a particular TDMA or IDMA of the structure, and the value of the corresponding bit of the TDMA/IDMA full flag is "1", then the corresponding area (TDMA or IDMA) is regarded as being full or in a 'full' state. Accordingly, this TDMA/IDMA can no longer be used because the TDMA/IDMA is full.

FIG. 10 also shows that the Spare Area full flag field includes the 8-bit structure indicated by the arrow extending therefrom. Similarly, the TDMA/IDMA full flag field (also in TDDS) includes the 8-bit structure indicated by the arrow extending therefrom. A number of bytes (size) and corresponding sectors is also indicated in the example of a field in TDDS shown in FIG. 10.

As one example, the bits b3, b2, b1 and b0 of the Spare Area full flag are use to indicate respectively whether or not the outer spare area OSA1, the inner spare area ISA1, the outer spare area OSA0, and the inner spare area ISA0 are full. For instance, if the Spare Area full flag has a value of 00000011, this may indicate that the inner and outer spare areas ISA0 and OSA0 are full. If the BD-WO is a single layer disc, then only the bits b1 and b0 may be used.

As another example, the bits b4-b0 of the TDMA/IDMA full flag are used to indicate respectively whether or not the IDMA in the OSA1, the IDMA in the ISA1, the IDMA in the OSA0, the TDMA in the lead-out area, and the TDMA in the lead-in area are full. For instance, if the TDMA/IDMA full flag has a value of 00000010, then this may indicate that only the TDMA in the lead-out area is full. Obviously, other examples and assignment of bit values and positions are possible for these full flags.

In one embodiment, the size of the TDDS is fixed, e.g., 1 cluster, and the size of the TDFL is variable in recording the TDDS and the TDFL in FIG. 6. The size of the TDFL of a dual layer BD-WO as shown in FIG. 5 can be changed from 1 cluster to 8 clusters. This size may be determined considering the capacity of an entire disc and the size of the spare area.

According to the method of using the TDMA/IDMA, if a defective area is created or discovered when data are recorded on a BD-WO, the data recorded or to be recorded on the defective area of the BD-WO are recorded on a predetermined area (e.g., spare area) for linear replacement in the BD-WO.

Figure 7:
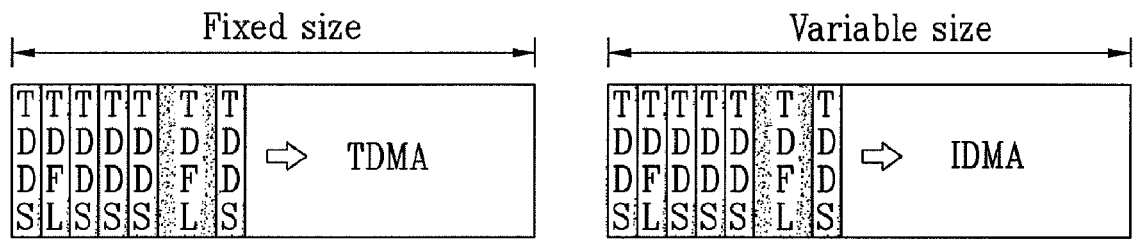
FIG. 7 illustrates another example of a temporary or interim defect management area usage method of the present invention.

FIG. 7 illustrates another example of a temporary or interim defect management area usage method of the present invention. In the method of using the temporary or interim defect management area shown in FIG. 7, the TDMA and IDMA are used randomly without determining any usage order. The TDMA and IDMA full flags discussed in reference to FIG. 10 are equally applied herein.

If the TDMA/IDMA full flag indicates certain TDMA/IDMA is full, then a subsequent or TDMA/IDMA in the BD-WO is used. In a random case such as the case shown in FIG. 7, no usage order is specified. If all the TDMAs and IDMAs are full, defects on the BD-WO cannot be managed any longer. When defects cannot be managed any longer, final information of TDDS and TDFL (i.e., the last updated TDDS and TDFL in the TDMA/IDMA) is transferred and recorded on at least one of the DMAs (DMA1-DMA4) to reflect the current disc status. Here, the same defect management information may be recorded in each of the DMAs so that if one DMA becomes defective, the important defect management information would not be lost. More discussion on recordation of final information on a DMA will be provided later.

According to the embodiment of FIG. 7, the data of a defective area are recorded on a predetermined area for linear replacement. The defect management information pertaining to this defective area and the replacement area is randomly recorded on the desired TDMA or IDMA. For example, the TDMA or IDMA nearest to the area where a defective area is located on the BD-WO is available for recording such defect management information. Therefore, as shown in FIG. 7, the TDMA or IDMA may be used variably, or as needed.

In another method of using a temporary defect management area in the embodiment of FIG. 7, a plurality of defect management areas are used variably depending upon a variety of conditions. In one example, the defect management information may be recorded only on an IDMA when using the BD-WO. The latest defect management information is recorded on a TDMA later when ejecting the BD-WO. In other words, the choice of an area in which to record defect management information is determined between the area to record defect management information when using the disc and the area to record defect management information when ejecting the disc.

In another example, when recording data on the BD-WO, the data recorded (or to be recorded) on the defective area are recorded on the predetermined area for linear replacement if a defective area is created or discovered during the process of recording data. The defect management information is recorded on an IDMA when using the disc. The same defect management information is again recorded on the TDMA when ejecting the disc. Since the TDMA is positioned in a management area (lead-in or lead-out) of an inner track of a disc, a system first obtains information from the management area when the disc is initially loaded. The TDMA includes the latest management information even in a situation in which a previous disc has been ejected.

As another method of using the disc, various objects are used for selecting one of a plurality of defect management areas. One method of using the disc is based on significance. For example, when the significance to update the defect management information is low, the IDMA may be used to record the defect management information therein. When the significance to update the defect management information is high, the TDMA may be used to record the defect management information therein. Here, the criterion used to determine the significance can be set variously. The frequency of refreshing (updating) defect management information can be made conditional, or based on a designer's choice. The time to eject a disc may also be designated as a significant time in recording defect management information. In such a case, the time a disc is in use is regarded to be less significant so that during this time, the defect management information may be recorded on the IDMA. The time to eject a disc may be regarded to be more significant so that during this time, the defect management information may be recorded on the TDMA. The methods that a designer decides to use are employed discretionately.

One of the criteria used to determine significance is an update interval (e.g., for updating the defect management information). In other words, if the time duration between the previous update time and the present update time is long, the present update information is regarded to be relatively significant. In this case, the defect management information can be recorded on a TDMA (instead of an IDMA) even though the disc is in use. Another criterion to determine significance is the number of defective areas created or discovered. If there are relatively many defective areas, since it is regarded that more reliability is required, defect management information may be recorded on a TDMA (instead of an IDMA) even though the disc is in use.

According to the objects of use, if defect management information is recorded on a TDMA according to significance, since the TDMA is positioned on the inner track, significant information can be rapidly and precisely obtained, beginning from the initial time of loading the disc.

Figure 8:
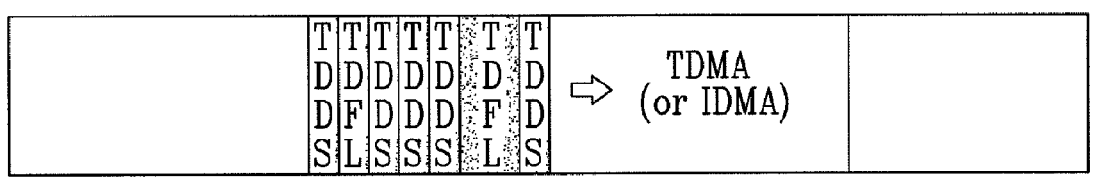
FIG. 8 illustrates another example of a temporary or interim defect management information composition method of the present invention.
Figure 9:
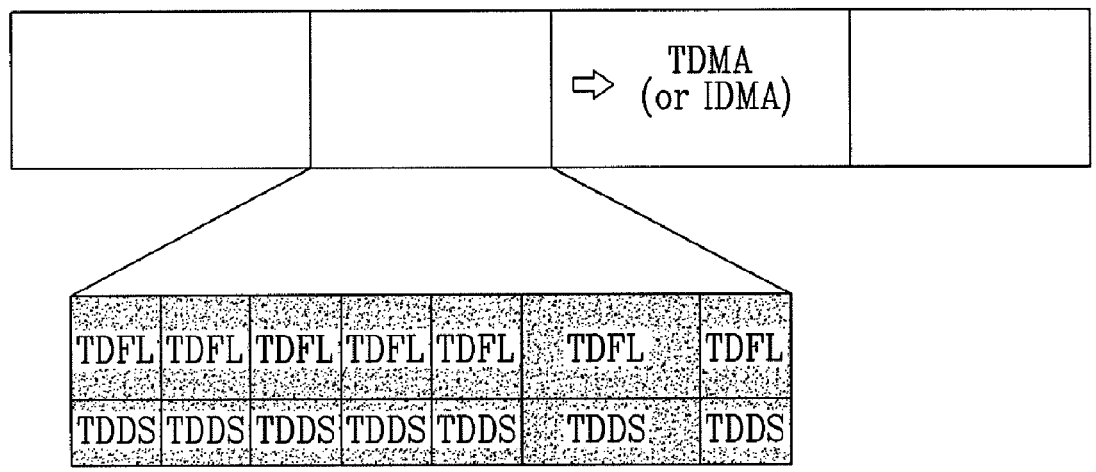
FIG. 9 illustrates another example of a temporary or interim defect management information composition method of the present invention.

FIGS. 8 and 9 illustrate examples of a temporary or interim defect management information composition method according to the embodiments of the present invention. In one embodiment, the present invention provides a method of composing and recording defect management information (TDDS and TDFL) on a TDMA or IDMA, wherein the TDDS and the TDFL are separated from each other. Another embodiment of the present invention provides a method of composing and recording defect management information on a TDMA or IDMA wherein the TDDS and the TDFL are integrated with each other. FIG. 8 shows the former case (separated) and FIG. 9 shows the latter case (integrated).

Particularly, FIG. 8 illustrates a method of composing and recording defect management information on a TDMA or IDMA wherein the TDDS and the TDFL are separated from each other. Each TDDS has a fixed size, e.g., 1 cluster, and the size of each TDFL is variable from, e.g., 1 cluster to 8 clusters.

FIG. 9 illustrates a method of composing and recording defect management information on a TDMA or IDMA wherein the TDDS and the TDFL of the TDMA or IDMA are integrated with each other. Defect management information is recorded in the form of TDFL+TDDS as shown in FIG. 9. That is, each time the defect management information is updated, both the latest TDFL and TDDS are recorded in the TDMA or IDMA. Since the size of the TDFL can be variable from 1 cluster to 8 clusters as described above, the size of the (TDFL+TDDS) is variable from 1 cluster to 8 clusters. The methods of FIGS. 8 and 9 are applicable to each of the disc structures and TDMA/IDMA usage methods discussed in this disclosure.

Figure 11:
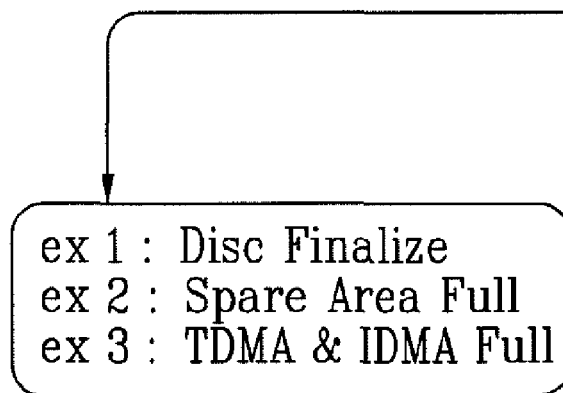
FIG. 11 is a table of comparison of DMA, TDMA and IDMA of the present invention.

FIG. 11 is a table representing when a DMA, a TDMA and an IDMA are used and what information each of the DMA, TDMA and IDMA has according to the objects of use. For example, the defect management information is recorded on an IDMA when using the BD-WO. The defect management information is recorded on the TDMA when ejecting the BD-WO. The defect management information is recorded on the DMA when the DMA fill-in process may occur which happens, e.g., the BD-WO is to be finalized and data is not recorded any longer, when a spare area is full, or when a TDMA or IDMA is full and defects cannot be managed any longer. The full information (e.g., full flags) is recorded in TDDS as shown in FIG. 10. If the TDMA and the IDMA are not separated according to the objects of use, it is clear that times at which to record the defect management information on the TDMA and IDMA do not have to be distinguished from each other. The table in FIG. 11 representing when a DMA, a TDMA and an IDMA are used and what information each of the DMA, TDMA and IDMA has according to the objects of use apply to the structures discussed above, including the structures and methods shown in FIGS. 4-10, and the apparatus shown in FIG. 3.

In the present invention, the information to be recorded on the defective area is recorded on the area for linear replacement in the BD-WO. The defect management information is recorded on a plurality of temporary management areas provided separately on a predetermined area of the disc. The temporary management areas are divided into a temporary management area having a fixed size and a temporary management area having a variable size depending on the spare area so that defect management information can be managed more effectively.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of managing defects on a recording medium having at least one temporary defect management area, the method comprising:
    recording defect management information onto one of the at least one temporary defect management area;
    recording indication information for identifying which temporary defect management area is full; and
    recording last updated defect management information onto a final defect management area of the recording medium when all of the temporary defect management areas within the recording medium are full.

2. An apparatus for managing defects on a recording medium having at least one temporary defect management area, the apparatus comprising:
    an pickup to record data onto the recording medium; and
    a microcomputer configured to control the pickup to record defect management information onto one of the at least one temporary defect management area, and control the pickup to record indication information for identifying which temporary defect management area is full.

3. The apparatus of claim 2, wherein the microcomputer is configured to control the indication information to be recorded as at least one indicator respectively corresponding to the at least one temporary defect management area, each indicator identifying whether or not a corresponding temporary defect management area is full.

4. The apparatus of claim 2, wherein the microcomputer is configured to use the at least one temporary defect management area in a predetermined order for recording therein the defect management information, and control the pickup to record the defect management information onto a temporary defect management area subsequent to a temporary defect management area indicated being full.

5. The apparatus of claim 2, wherein the microcomputer is configured to finalize the recording medium when all of the temporary defect management area located in the recording medium is full.

6. The apparatus of claim 2, wherein the microcomputer is configured to control the pickup to record last updated defect management information onto a final defect management area of the recording medium when finalizing the recording medium.

7. A method of managing defects on a recording medium having at least one temporary defect management area, the method comprising:
    reproducing indication information for identifying which temporary defect management area is full; and
    reproducing defect management information from a final defect management area of the recording medium if the indication information identifies that all of the temporary defect management areas within the recording medium are full.

8. The method of claim 7, further comprising:
    recording updated defect management information onto the temporary defect management area which is not full, based on the indication information.

9. The method of claim 7, further comprising:
    reproducing defect management information from the final defect management area of the recording medium once the recording medium is finalized.

10. An apparatus of managing defects on a recording medium having at least one temporary defect management area, the apparatus comprising:
- a pickup to record/reproduce data on/from the recording medium; and
- a microcomputer configured to control the pickup to reproduce indication information for identifying which temporary defect management area is full, and control the pickup to reproduce defect management information from a final defect management area of the recording medium if the indication information identifies that all of the temporary defect management areas are full.

11. The apparatus of claim 10, wherein the indication information includes at least one indicator respectively corresponding to the at least one temporary defect management area, each indicator identifying whether or not a corresponding temporary defect management area is full.

12. The apparatus of claim 11, wherein the microcomputer is configured to control the pickup to record updated defect management information onto the temporary defect management area which is not full, based on the indication information.

13. The apparatus of claim 11, wherein the microcomputer is configured to use the at least one temporary defect management area in a predetermined order for recording therein defect management information, and control the pickup record updated defect management information onto a temporary defect management area subsequent to a temporary defect management area indicated being full.

14. The apparatus of claim 10, wherein the microcomputer is configured to finalize the recording medium when all of the temporary defect management area located in the recording medium is full.

15. The apparatus of claim 14, wherein the microcomputer is configured to control the pickup to record last updated defect management information onto the final defect management area of the recording medium when finalizing the recording medium.

16. The apparatus of claim 14, wherein the microcomputer is configured to the pickup to reproduce defect management information from the final defect management area of the recording medium once the recording medium is finalized.

17. A recording medium comprising:
- at least one temporary defect management area for storing therein defect management information until the recording medium is finalized; and
- indication information for identifying which temporary defect management area is full.

18. The recording medium of claim 17, wherein the indication information includes at least one indicator respectively corresponding to the at least one temporary defect management area, each indicator identifying whether or not a corresponding temporary defect management area is full.

19. The recording medium of claim 17, further comprising:
- a final defect management area for storing therein last updated defect management information when the recording medium is to be finalized.

20. The recording medium of claim 19, wherein the recording medium is to be finalized when all the temporary defect management area located in the recording medium becomes full.

* * * * *